A. SHELDON.
GARDEN HOE.
APPLICATION FILED FEB. 1, 1910.
962,392.
Patented June 21, 1910.
2 SHEETS—SHEET 1.
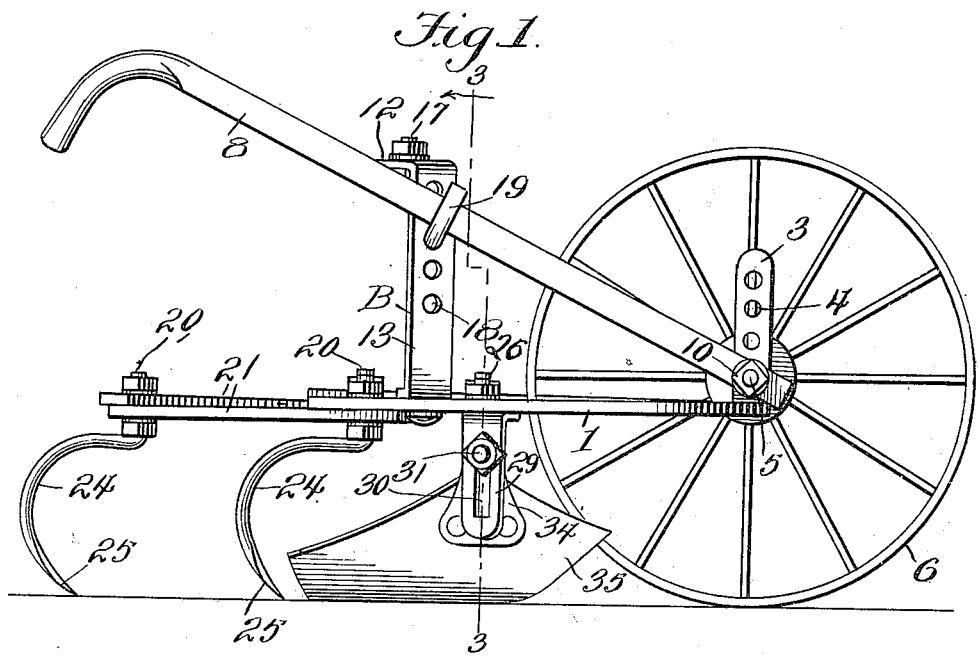
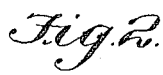
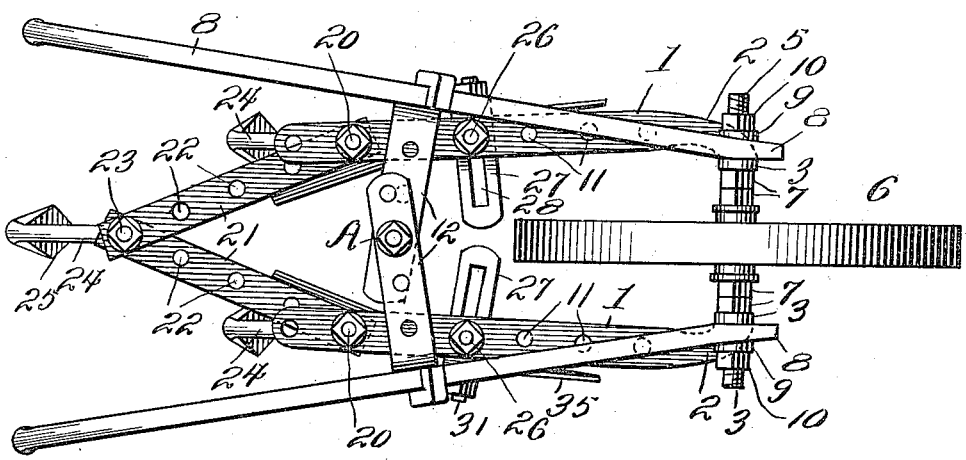
Witnesses
J. T. L. Wright
Wm. Bagger
Inventor
Angus Sheldon
By Victor J. Evans,
Attorney A. SHELDON.
GARDEN HOE.
APPLICATION FILED FEB. 1, 1910.
962,392.
Patented June 21, 1910.
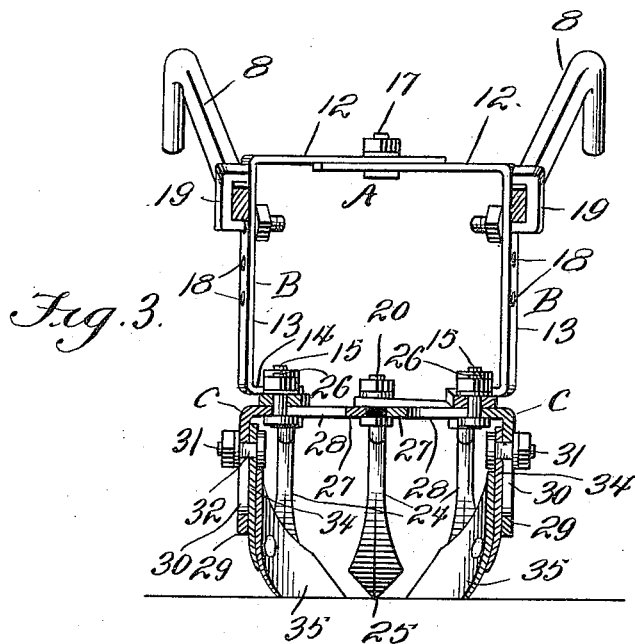
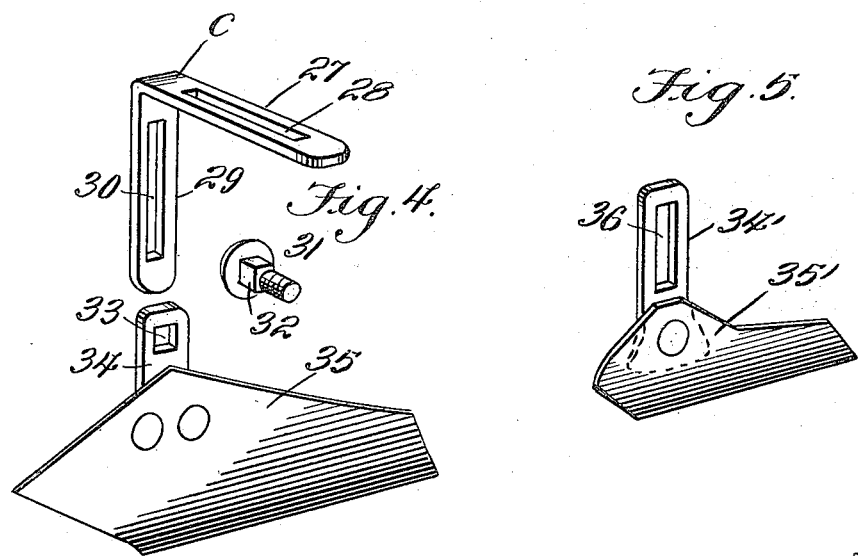

UNITED STATES PATENT OFFICE.

ANGUS SHELDON, OF KENTON, OHIO.

GARDEN-HOE.

962,392.

Specification of Letters Patent. Patented June 21, 1910.

Application filed February 1, 1910. Serial No. 541,315.

*To all whom it may concern:*

Be it known that I, ANGUS SHELDON, a citizen of the United States of America, residing at Kenton, in the county of Hardin and State of Ohio, have invented new and useful Improvements in Garden-Hoes, of which the following is a specification.

This invention relates to that class of implements for cultivating the soil in which a tool carrying frame is provided with a guiding wheel and with handles whereby it may be manually propelled and which are generally known as garden plows or garden hoes, according to the nature of the earth-engaging tools employed, and it has for its objects to produce a device of this class which shall be simple in construction and efficient in operation; in which the frame may be readily adjusted in various ways and in which the earth-engaging tools may be readily transposed or interchanged in a variety of ways.

With these and other ends in view which will readily appear as the nature of the invention is better understood, the same consists in the improved construction and novel arrangement and combination of parts which will be hereinafter fully described and particularly pointed out in the claims.

In the accompanying drawings has been illustrated a simple and preferred form of the invention, it being, however, understood that no limitation is necessarily made to the precise structural details therein exhibited, but that changes, alterations and modifications within the scope of the invention may be resorted to when desired.

In the drawings,—Figure 1 is a side elevation of an implement constructed in accordance with the invention. Fig. 2 is a top plan view of the same. Fig. 3 is a transverse vertical sectional view taken on the plane indicated by the line 3—3 in Fig. 1. Fig. 4 is a perspective view, showing one of the tool-carrying brackets, one of the tools and a connecting bolt, the same being detached from the frame and separated from each other. Fig. 5 is a perspective view, showing a tool of a slightly modified construction.

Corresponding parts in the several figures are denoted by like characters of reference.

The frame of the improved implement is constructed essentially of two side members 1, 1 consisting of flat bars having their front ends curved or offset laterally in an inward direction, as seen at 2, 2, said inwardly offset portions being provided at their inner extremities with upstanding brackets 3 each having a series of perforations 4 for the passage of a shaft or axle 5 carrying a wheel 6 which is separated from the upstanding brackets by washers or spacing members 7. Adjacent to the outer sides of the brackets 3 the handles 8 are mounted upon the axle 5 where they are secured by means of washers 9 and nuts 10.

The flat bars constituting the side members 1 are provided at intervals with apertures 11, some of which serve for the attachment of an adjustable arch member composed of two bracket members B, B, each including an approximately horizontal arm 12 and an approximately vertical arm 13, said arms 13 being provided at their lower ends with inturned lugs 14 which are perforated for the passage of bolts 15, whereby they are secured upon the frame bars 1. The horizontal arms 12 which overlap one another are each provided with a plurality of apertures 16, two of which are brought into registry with each other for the passage of a bolt 17, whereby they may be connected together, thus constituting a complete, adjustable arch, whereby the side members of the frame are connected together and maintained against relative lateral displacement. The vertical arms or members 13 of the arch member are provided with apertures 18 for the passage of hook bolts 19, whereby the handles 8 may be supported at various vertical adjustments.

Secured upon the side members 1 of the frame by means of bolts 20 passing through perforations 11 are rearwardly extending braces 21 overlapping one another and each provided with a plurality of apertures 22, two of which may be brought into registry for the passage of a connecting bolt 23. The bolts 20 and 23 are further utilized for the attachment of shanks 24 carrying earth-engaging implements, such as cultivator blades 25 which may be formed integrally with the shanks if desired, although separate blades may be employed, if preferred.

Secured upon the undersides of the side members 1 of the frame by means of bolts 26 passing through perforations 11 are angular or L-shaped brackets C, the horizontal arms of which, 27, are provided with slots

28 for the passage of the connecting bolts 26, thus permitting said brackets to be laterally adjusted. The vertical arms 29 of said brackets are likewise provided with slots 30 for the passage of connecting members, such as bolts 31, the shanks of which are provided with square portions 32 to engage the slots 30 and to also engage square openings 33 in lugs or shanks 34 connected with the earth-engaging members or plow blades 25, which latter may thus be firmly secured in position in such a manner as to be capable of vertical adjustment by moving the connecting member in the slot 30. The earth-engaging member may consist of a hoe-shaped blade of the approximate configuration shown in Fig. 4, or it may be of the slightly modified shape shown at 35′ in Fig. 5, where said blade is provided with a lug or shank 34′ having an elongated slot 36, whereby the range of vertical adjustment will be increased.

As will be seen from the foregoing description I have provided a tool of simple and efficient construction in which the earth-engaging tools may be readily mounted in various positions according to the work to be performed, it being evident that the blades 35 and 35′ may be used interchangeably either in connection with the cultivating members 25 or independently of the latter. It will also be understood that the blades 35 or 35′ may be temporarily dispensed with, the cultivating members being used independently of such blades. The improved implement is light, strong and durable and may be readily propelled and operated manually, thus furnishing a very simple and efficient garden tool useful in truck culture and the like.

Having thus described the invention, what is claimed as new, is:—

1. In an implement of the character described, a frame including side members consisting of flat bars provided throughout with apertures and having inwardly offset front ends provided with upstanding brackets, each having a series of apertures, an axle extending through two apertures in the vertical brackets, a guiding wheel mounted for rotation upon said shaft, handles supported at their forward ends upon the shaft, a spacing member consisting of an arch comprising two adjustably connected members mounted upon and rising from the side members of the frame and each having a plurality of apertures, and hook bolts adjustably connecting the handles with the members of the arch.

2. In an implement of the character described, a frame including side members provided adjacent to their front ends with upstanding brackets, a wheel-carrying shaft supported adjustably in said brackets, an arch member comprising adjustably connected side members supported upon the side members of the frame, rearwardly extending arms supported upon the side members of the frame and overlapping one another, bolts connecting said arms together and with the side members of the frame, and tool-carrying shanks supported upon said bolts.

In testimony whereof I affix my signature in presence of two witnesses.

ANGUS $\overset{\text{his}}{\times}$ SHELDON.
mark

Witnesses:
C. W. FAULKNER,
ANDA WELLS.